United States Patent [19]

Waddill et al.

[11] 4,226,971

[45] Oct. 7, 1980

[54] PHENOL-ALDEHYDE CONDENSATION PRODUCT WITH AMINOALKYLENE DERIVATIVE OF A POLYOXYALKYLENEPOLYAMINE

[75] Inventors: Harold G. Waddill, Austin; Howard P. Klein, Houston, both of Tex.

[73] Assignee: Texaco Development Corp., White Plains, N.Y.

[21] Appl. No.: 5,125

[22] Filed: Jan. 22, 1979

Related U.S. Application Data

[60] Division of Ser. No. 927,260, Jul. 24, 1978, Pat. No. 4,164,520, Continuation-in-part of Ser. No. 865,053, Dec. 27, 1977, abandoned.

[51] Int. Cl.² .................................................. C08G 14/06
[52] U.S. Cl. ...................................... 528/162; 528/159
[58] Field of Search ................................. 528/162, 159

[56] References Cited

U.S. PATENT DOCUMENTS

| | | | |
|---|---|---|---|
| 3,236,895 | 2/1966 | Lee et al. | 528/68 X |
| 3,306,809 | 2/1967 | Williamson et al. | 528/111 X |
| 3,462,393 | 8/1969 | Legler | 528/107 |
| 3,639,928 | 2/1972 | Bentley | 528/123 X |
| 3,666,788 | 5/1972 | Rowton | 528/67 X |
| 3,734,965 | 5/1973 | Becker | 528/162 |
| 4,115,360 | 9/1978 | Schulze et al. | 528/111 X |
| 4,164,520 | 8/1979 | Waddill et al. | 525/484 |

*Primary Examiner*—Howard E. Schain
*Attorney, Agent, or Firm*—Carl G. Ries; Thomas H. Whaley; Kenneth R. Priem

[57] ABSTRACT

A process for the accelerated cure of an epoxy resin is disclosed. The resulting epoxy resin may be used in protective coatings, adhesives, seamless and terrazo flooring and caulking and sealing compositions. The resulting resin system is also useful, for example, in casting, potting, in escapulating, grouting and patching. The process involves mixing an epoxy resin of the polyhydric phenol, polyglycidyl ether type with a novel accelerator-hardener which is a condensation product of phenol, formaldehyde and an aminoalkylene derivative of a polyoxyalkylenepolyamine.

5 Claims, No Drawings

PHENOL-ALDEHYDE CONDENSATION PRODUCT WITH AMINOALKYLENE DERIVATIVE OF A POLYOXYALKYLENEPOLYAMINE

This is a division, of application Ser. No. 927,260 filed July 24, 1978 now U.S. Pat. No. 4,164,520 issued Aug. 14, 1979 which is a continuation-in-part of application Ser. No. 865,053, filed Dec. 27, 1977, now abandoned.

BACKGROUND OF THE INVENTION

The present invention relates to the field of curing epoxy resins.

Polyoxypropylenepolyamines react with epoxy resins at a rate which is unsatisfactorily slow for certain applications. In order to provide a rate of cure which is satisfactory for most uses an accelerator must be used with the polyoxypropylenepolyamines in order to speed the rate of cure.

Lee, Henry and Neville, Kris, Handbook of Epoxy Resins, McGraw-Hill Book Co., N.Y., 1967, p. 7-14, describes the use of N-(2-aminoethyl)piperazine as an epoxy curing agent and at page 11-18 describes the use of salicylic acid as an accelerator for urea-formaldehyde epoxy resin coatings. Bobby Leger's U.S. Pat. No. 3,462,393 (Aug. 18, 1969) teaches the use of polyoxyalkylenepolyamines as curing agents for a polyglycidyl ether of a phenolic compound.

U.S. Pat. No. 3,639,928 claims the use of a combination of N-(3-aminopropyl)piperazine and salicylic acid as an accelerator combination with polyoxyalkylenepolyamine for curing epoxy resins.

U.S. Pat. No. 3,734,965 describes the use of a condensation product of phenols, aldehydes and polyoxypropyleneamines.

SUMMARY OF THE INVENTION

The invention is a process for the accelerated cure of an epoxy resin composition of the polyhydric phenol, polyglycidyl ether type. The process involves mixing the epoxy resin with an accelerator-hardener which is a condensation product of phenol, formaldehyde and an aminoalkylene derivative of a polyoxyalkylenepolyamine. The invention is also the condensation product above and the resulting cured epoxy resin.

DESCRIPTION OF THE PREFERRED EMBODIMENTS

The epoxy resin used herein can be any of the well known epoxy resins having an epoxy equivalency of more than one, for example, the polyglycidyl ether of polyhydric phenol. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. The epoxy resin is derived from condensing epichlorohydrin with 2,2-bis(p-hydroxyphenyl) propane, known generally as bisphenol-A and having an epoxide equivalent weight of from 175 to 195.

The aminoalkylene derivatives of polyoxyalkylenepolyamines can be made by reacting polyoxyalkylenepolyamines with acrylonitrile followed by hydrogenation of the product. For example, polyoxypropylenepolyamines used as starting materials include compounds of the following formulae:

(1)

where x=2 to 40
and

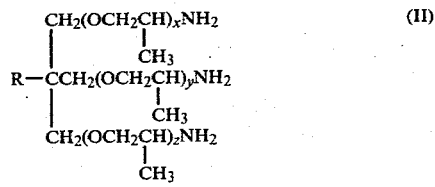
(II)

where x+y+z=3 to 40
and

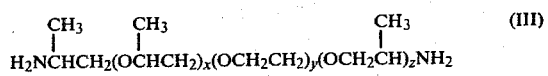
(III)

where x+z=2 to 10 and y=1 to 50

After reaction with acrylonitrile and subsequent hydrogenation the resulting aminoalkylene derivative of polyoxyalkylenepolyamines have the following formulae:

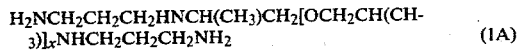
(IA)

where x=2 to 40
and

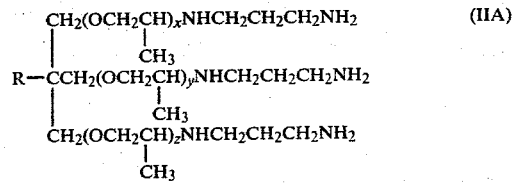
(IIA)

where x+y+z=3 to 40
and

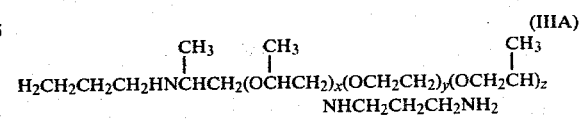
(IIIA)

where x+z=2 to 10 and y=1 to 50

It is preferred to use phenol but substituted phenols are also useful in the condensate. The substituted phenols include, for example, mono- or polyhydric phenols with at least one reactive nuclear position available for substitution (o or p.). Examples: o-, m-, p-cresol, resorcinol, pyrocatechol, hydroquinone, phloroglucinol, pryogallol, α and β-naphthol, p-tert-butylphenol, 4,4'-dihydroxydiphenylmethane, 4,4'-dihydroxydiphenylether, 4,4'-dihydroxydiphenylsulphone. It is preferred to use formaldehyde but useful aldehydes include both aliphatic and aromatic aldehydes, for example: acetaldehyde, butyraldehyde, benzaldehyde. Aldehydes of the general formula below are useful:

RHCO wherein R=H—, $CH_3$—, $C_2H_5$—$C_4H_9$ or

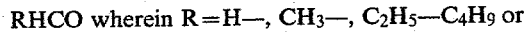

The preparation of the condensation product is performed as follows but obvious deviations from this scheme are included in our invention: phenol, formaldehyde and a small amount of triethylamine is heated at reflux (~100° C.) for 1-2 hours and then cooled to <50° C. Amine (aminoalkylene derivative of polyoxyalkylenepolyamines) addition is begun while raising the temperature to about 165° C. while water is removed. Water is removed until overhead temperature drop is noted. The product is then vacuum stripped at 150° C./30mm for 2-4 hours.

The pressure is atmospheric except where vacuum stripping is noted. No pH adjustment is made during the reaction. The ratio of aminoalkylene derivative of polyoxyalkylenepolyamine/phenol/formaldehyde may range about 3/1/1 to 1/1/1. These variables are only guidelines and should not be construed as limitative of the invention claimed hereinafter.

For curing epoxy resins, the hardening agent (the condensate herein) is usually added in an amount such that there is one reactive -NH group in the hardener component for each epoxy group in the epoxy resin component. These are known as stoichiometric quantities. The stoichiometric quantity can be calculated from a knowledge of the chemical structure and analytical data on the components. In general it is advantageous to use up to 10 percent excess of the accelerated hardener over the stoichiometric amount.

The curing temperature range of the ambient temperatures are from about 0° to about 45° C. Post cures at temperatures up to about 200° C. are optional. The cured epoxy resins of the invention are useful in castings, coatings, adhesives, laminates, filament-reinforced composites, seamless flooring, terrazzo flooring, crushed-stone aggregates and in grouting, caulking and sealing compositions.

EXAMPLE I

Preparation of a condensate of the aminopropylene derivative of a 230 molecular weight polyoxypropylenepolyamine with phenol and formaldehyde.

| Reactants: | |
|---|---|
| JEFFAMINE ®D-230 Bis(propylamine)* (JEFFAMINE ®D-230 BPA) | 1338 g. |
| Phenol | 355 g. |
| Formaldehyde | 306 g. (37% soln.) |
| Triethylamine(TEA) | 10 g. |

*JEFFAMINE D-230 is a polyoxypropylenepolyamine of formula I (x is about 2.6) and JEFFAMINE D-230 Bis(propylamine) is the aminopropylene derivative of JEFFAMINE D-230.

The phenol, formaldehyde and TEA were added to a reactor and heated to reflux temperature (about 100° C.) for 2 hours and then cooled to 95° C. The JEFFAMINE D-230 BPA was added to the mixture in the reactor while raising the temperature to about 135° C. The product was then vacuum stripped at 130° C./30mm for 2 hours.

EXAMPLE II

Preparation of a condensate of the aminopropylene derivative of a 400 molecular weight polyoxypropylenepolyamine with phenol and formaldehyde.

| Reactants: | |
|---|---|
| JEFFAMINE ®D-400 Bis(propylamine)* | 1368 g. |
| Phenol | 259 g. |
| Formaldehyde | 223 g. (37% soln.) |
| Triethylamine (TEA) | 9.25 g. |

*JEFFAMINE D-400 is a polyoxypropylenepolyamine of formula I (x is about 5.6) and JEFFAMINE D-400 Bis(propylamine) BPA is the aminopropylene derivative of JEFFAMINE D-400.

The procedure in Example I was followed except the maximum temperature of the reactor was 165° C. prior to vacuum stripping.

EXAMPLE III

ACCELERATION OF CURE THROUGH USE OF PHENOL-FORMALDEHYDE CONDENSATE OF AN AMINOALKYLENE DERIVATIVE OF A POLYOXYALKYLENEPOLYAMINE

| Formulation: | A | B | C | D |
|---|---|---|---|---|
| Epoxy resin (EEW 190) | 100 | 100 | 100 | 100 |
| JEFFAMINE D-400 Bis(propylamine) | 46 | — | — | — |
| JEFFAMINE D-400 BPA** . Phenol . Formaldehyde Condensate | — | 52 | — | — |
| JEFFAMINE D-230 Bis(propylamine) | — | — | 30 | — |
| JEFFAMINE D-230 BPA . Phenol . Formaldehyde Condensate | — | — | — | 38 |
| Gel time, mins. (200 g. mass) | 160.3 | 92.4 | 73.5 | 30.8 |
| Peak Exotherm, °C. | 160.0 | 126.5 | 224.0 | 213.0 |
| Time to peak, mins. | 178.0 | 114.0 | 85.0 | 43.0 |

EXAMPLE IV

DEVELOPMENT OF ADHESION: CURING WITH PHENOL.FORMALDEHYDE CONDENSATE VS. JEFFAMINE D-230 BPA

| Formulation | A | B |
|---|---|---|
| Epoxy resin (EEW 185) | 100 | 100 |
| JEFFAMINE D-230 Bis(propylamine) | 30 | — |
| JEFFAMINE D-230 BPA . Phenol . Formaldehyde Condensate | — | 38 |
| Tensile shear strength, psi after curing for: 4 hours | <5 | 0 |
| 8 hours | 900 | 1100 |
| 16 hours | 2200 | 2900 |
| 24 hours | 1200 | 3000 |

EXAMPLE V

COMPARISON OF CONDENSATION PRODUCT OF THIS INVENTION WITH SIMILAR CONDENSATE USING POLYOXYPROPYLENEAMINES

Comparison of Properties: Curing with JEFFAMINE D-400; D-400.Phenol.formaldehyde Condensate with BPA D-400.Phenol. formaldehyde Condensate

| Formulation: | A | B | C |
|---|---|---|---|
| Epoxy resin (EEW 185) | 100 | 100 | 100 |
| JEFFAMINE D-400 | 50 | — | — |
| D-400 . Phenol . CH$_2$O Cond. | — | 75 | — |
| BPAD-400 . Phenol . CH$_2$O Cond. | — | — | 55 |
| Brook. visc., cps., R.T. | 500 | 3800 | 4700 |
| Gel time, mins (200 g. mass) | ~300 | 142 | 28.3 |
| Peak exotherm, °C. | — | 71.5 | 164.0 |
| Time to peak temp., mins. | — | 180 | 38.0 |
| Drying time, 6-mil film Set-to-touch, hrs. | 13.3[2] | 9.9 | 4.0 |
| Thru-dry, hrs. | 15.2 | 13.2 | 5.0 |
| Rev. impact, in-lbs to fail | | | |

| | | | |
|---|---|---|---|
| cure: 24 hr., R.T. | >160 | 148 | >160 |
| 7 day, R.T. | >160 | 12 | 20 |
| 14 day, R.T. | >160 | 100 | 100 |
| Properties of cured ⅛" castings:[1] | | | |
| Izod impact strength, ft-lbs/in. | 0.52 | 0.97 | 0.94 |
| Tensile strength, psi | 8200 | 9100 | 9300 |
| Tensile modulus, psi | 399000 | 456000 | 438000 |
| Elongation at break, % | 3.7 | 4.6 | 6.0 |
| Flexural strength, psi | 12200 | 13200 | 14200 |
| Flexural modulus, psi | 400000 | 447000 | 457000 |
| HDT, °C., 264 psi/66 psi | 41.5/42 | 46/50 | 56/59 |
| Shore D hardness, 0-10 sec. | 80-77 | 84-82 | 86-85 |
| % wt. gain, 1 hr. acetone boil | — | 13.67 | 5.36 |
| % wt. gain, 24 hr. H₂O boil | — | 2.34 | 2.94 |

[1]Cured 2 hrs. 80°, 3 hrs. 125° C.
[2]D-400 Concn. = 55 phr.

Comparison of Properties: Curing with JEFFAMINE D-400, D-300 . Phenol . CH₂O Condensate and BAPD-400 . Phenol . CH₂O Condensate (Acc. Curing, R.T.)

| Formulation: | A | B | C |
|---|---|---|---|
| Epoxy resin (EEW 185) | 100 | 100 | 100 |
| JEFFAMINE D-400 | 45 | — | — |
| D-400 . Phenol . CH₂O Cond. | — | 75 | — |
| BPAD 400 . Phenol . CH₂O Cond. | — | — | 55 |
| Acc. 398 | 10 | 10 | 10 |
| Brook. visc., cps., R.T. | —. | 3800 | 5000 |
| Gel time, mins. (200 g. mass) | 41.0 | 31.2 | 14.2 |
| Peak exotherm, °C. | 163.0 | 164.0 | 194.0 |
| Time to peak, mins. | — | 42.0 | 19.5 |
| Drying time, 6-mil film | | | |
| Set-to-touch, hrs. | 8.3 | 6.0 | 2.0 |
| Thru-dry, hrs. | 11.8 | 8.8 | 3.0 |
| Rev. impact, in-lbs to fail | | | |
| Cure: 24 hr., R.T. | >160 | >160 | >160 |
| 1 hr. 110° C. | >160 | >160 | 80 |
| 7 day, R.T. | >160 | 88 | 20 |
| 14 day, R.T. | >160 | >160 | 80 |
| Properties of cured ⅛" castings:[1] | | | |
| Izod impact strength, ft-lbs/in. | 0.62 | 0.88 | 0.98 |
| Tensile strength, psi | 7500 | 7000 | 9600 |
| Tensile modulus, psi. | 388000 | 418000 | 452000 |
| Elongation at break, % | 5.1 | 20.8 | 5.0 |
| Flexural strength, psi. | 9900 | 10900 | 15100 |
| Flexural modulus, psi. | 335000 | 336000 | 451000 |
| HDT, °C., 264 psi/66 psi | 40/42.5 | 37/39 | 48/49 |
| Shore D hardness, 0-10 sec. | 83-80 | 82-80 | 82-80 |
| % wt. gain, 1 hr. acetone boil | — | 14.40 | 9.06 |
| % wt. gain, 24 hr. H₂O boil | — | 4.67 | 3.75 |

[1]Cured 7 days, R.T.

It is clear from the above example that the drying times and touch times are much less using the condensate of the invention than with the prior art condensate or using polyoxypropyleneamines alone.

We claim:

1. The condensation product of phenol, formaldehyde and an aminoalkylene derivative of a polyoxyalkylenepolyamine made by reacting a polyoxyalkylenepolyamine with acrylonitrile followed by hydrogenation.

2. The condensation product of phenol, formaldehyde and an aminopropylene derivative of a polyoxypropylenepolyamine made by reacting a polyoxypropylenepolyamine with acrylonitrile followed by hydrogenation.

3. The condensation product of phenol, formaldehyde and an aminopropylene derivative of a polyoxypropylenepolyamine of about 400 molecular weight made by reacting a polyoxypropylenepolyamine of about 400 molecular weight with acrylonitrile followed by hydrogenation.

4. The condensation product of phenol, formaldehyde and an aminopropylene derivative of a polyoxypropylenepolyamine of about 230 molecular weight made by reacting a polyoxypropylenepolyamine of about 230 molecular weight with acrylonitrile followed by hydrogenation.

5. The condensation product of a phenolic compound, an aldehyde and an aminoalkylene derivative of a polyoxyalkylenepolyamine made by reacting a polyoxyalkylenepolyamine with acrylonitrile followed by hydrogenation.

* * * * *